UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

COMPOSITION FOR SIZING PAPER, &c.

1,007,681.     Specification of Letters Patent.     Patented Nov. 7, 1911.

No Drawing. Original application filed March 29, 1910, Serial No. 552,178. Divided and this application filed June 1, 1911. Serial No. 630,678.

*To all whom it may concern:*

Be it known that I, CARLETON ELLIS, a citizen of the United States, and a resident of Montclair, in the county of Essex and State of New Jersey, have invented certain new and useful Improvements in Composition for Sizing Paper, &c., of which the following is a specification.

This invention relates to resinous compositions adapted as a base for paper sizing and also for agricultural sprays and relates in particular to the use of unsaponifiable resins or resinous bodies in conjunction with saponifiable material for these purposes.

Paper sizing is usually made from rosin by saponification with caustic or carbonate of soda. Sometimes a lesser quantity of alkali than that sufficient to saponify the rosin is used so that free resin is present in the size. Agricultural sprays, on the other hand are usually made with an excess of caustic alkali, as they are found, generally speaking, to be more active if the alkali is used in slight excess.

Rosin soap, in concentrated solution, possesses considerable solvent power for various oils and I have found that it dissolves or blends with various resins, including resins which are practically or entirely unsaponifiable, such for example as rubber resin obtained in the purification of Jellutong or Pontianac gum. These resins, being unsaponifiable have been regarded as of no value in the manufacture of soaps and the like and have been practically waste products, although available in large quantities. The utilization of these low priced rubber resins for paper size and agricultural sprays is therefore a saving which leads to economy in the manufacture of paper and the like.

In a patent application, entitled, "Binding and coating composition" filed March 29th, 1910, Serial No. 552,178, I have set forth the method of utilizing the rubber resins for the purpose of making paper size. The present application contains the matter appearing in the aforesaid patent application on the subject of paper sizing, and is, to that extent, a divisional or divisional continuation of the aforesaid application. These rubber resins may be employed as a basis for paper size in partial substitution for rosin. In some of the paper sizing compositions, considerable free rosin is required. The free rosin may be displaced by Pontianac resin which is only slightly (if at all) saponifiable. The size may be made in liquid, or dry pulverulent condition. The addition of Guayule resin improves the binding quality of the size. Such a size may be prepared with a potash base, which makes a soft product by melting together 50 parts of Pontianac resin, 5 parts of Guayule resin and 50 parts of ordinary rosin and adding thereto a hot solution consisting of 50 parts of water, and 10 parts of caustic potash. The size may of course be made in any other way such as by adding the resinous materials to a boiling solution of caustic or carbonated alkali, or mixtures of these. A size made from caustic soda which is considerably harder may be made in accordance with the following formula:—50 parts of Pontianac resin, 7 parts of Guayule resin and 50 parts of ordinary rosin are melted and treated with a hot solution consisting of 10 parts of caustic soda to 100 parts of water. The water may be removed to produce a dry size in powdered form. These sizes may be used in the ordinary way, for example, by entering into a beater engine with the pulp and substantially treated with alum or other precipitating agent.

Other illustrative formulas, which do not involve the use of Guayule resin, are as follows:—Pontianac resin, 50 parts, ordinary rosin, 50 parts, caustic potash 10 parts, water 50 parts. This produces a rather firm soap or sizing. Another formula is composed of Pontianac resin 50 parts, ordinary rosin 50 parts, caustic potash 10 parts, water 50 parts. This differs from the previous formula only in the substitution of the caustic potash for the caustic soda, but the resulting size, or spraying composition is softer and more readily soluble. Another formula consists of Pontianac resin 25 parts, ordinary rosin 25 parts, caustic soda, 50% solution, 21 parts. A very firm product is secured with these proportions. It is in fact, so brittle that it may be fractured by a sharp blow. Another formula consists of Pontianac resin 25 parts, ordinary rosin 75 parts, caustic soda, 50% solution, 21 parts, water 14 parts. This produces a very thick and viscous size. Another formula consists of Pontianac resin 30 parts, ordinary rosin 75 parts, caustic soda solution of 50% strength 21 parts, water 36 parts. This makes a size which is adapted to be easily thinned with water. When so thinned the unsaponifiable Pontianac resin is not thrown out of solution as might be expected, but remains in collodial suspension or in solution in some form or condition so completely that it is only thrown down on the addition of alum or other precipitating agent, such as is used in the beater engine.

It will be seen from the foregoing that the Pontianac resin may be mixed with the ordinary rosin in various proportions to secure a size having more or less saponifiable material. Inasmuch as at the present time the Pontianac resin is cheaper than the ordinary rosin, it is desirable to use as large a proportion of the former as the condition of the sizing will permit. The use of Guayule resin involves the production of a rather dark colored size, which is however suitable for brown or other dark colored paper. A formula suitable for sizing dark brown wrapping paper is made from 25 parts each of rosin, Pontianac and Guayule resin, 7 parts of caustic soda and 50 parts of water. The manufacture of what is known as dry sizing may be readily conducted in this way, but it is desirable, in case the Pontianac or Guayule resins contain dirt or particles of rubber that these be removed by sedimentation or filtration.

The manner of combining the unsaponifiable resin and the saponifiable rosin or other saponifiable material is preferably as follows:—The resinous stock is melted raised a few degrees above melting point and the caustic alkali solution is added. This gives rise to the generation of a good deal of steam, owing to the fact that the melting point of the ordinary rosin and Pontianac resin, for example, is above the boiling point of water, but this may be taken care of by means of suitable apparatus, especially by the use of a capacious tank fitted with a suitable stirring apparatus. There are also several other ways of combining these ingredients, as, for example, first boiling the rosin with alkali and water to form a rosin soap and then adding the Pontianac or other resin in a powdered state and heating under conditions which give rise to the blending of the mixture. Or, for example, the rosin and the rubber resin may be melted together, cooled, finely ground and then treated with the alkali at the boiling temperature of aqueous solution of the alkali.

It is obvious if the composition is used for sizing paper it must be clean and free from particles of rubber and the like, hence the filtration of the rubber resin, or of the finished size, or any other method of purification may be resorted to if required.

For agricultural spraying compositions, a little oleate of potash or soda is desirable; also under certain circumstances mineral additions, such as arsenic trisulfid. The solution should be rather thin bodied for general use, as dilution is usually made with cold water.

For special dark colored size, the Pontianac resin may be previously heat treated. That is to say, it may be run at a temperature of from 500 to 600 degrees for an hour or more in order to break down the rubber particles and produce a dark colored, and more readily miscible product. The heating of Pontianac resin at, for example, 600 degrees F. for an hour gives rise to some bodies of a slightly acid nature, although the bulk of the resin remains unsaponifiable. The particles of rubber are reduced or destroyed however, to derivatives of a substantially resinous character, so that a very clean, uniform size may be made from this material.

Mixtures of Pontianac resin with carbohydrates, albumenoids, or similar colloid carriers may be employed. Glue, starch and casein may be used to form emulsions with Pontianac resin or other unsaponifiable resin. A mixture of 2 parts of glue, 1 part of starch, 4 parts of Jellutong resin, and 10 parts of water may be incorporated to make an emulsified pasty, or jelly-like material, which may be reduced with water at the time of using, or which may be made up in a liquid form by the addition of a sufficient amount of water to secure the desired consistency, and such a mixture may also be dried or cast in the form of sheets or plates, like ordinary sheets of glue and containing the Jellutong or other resin in a finely divided condition. Such a composition may be readily worked up in hot water.

One important advantage derived from the use of unsaponifiable, or substantially unsaponifiable resin, such as Pontianac resin and similar resins of the Jellutong type, is that these resins do not disintegrate under the action of light in the same way that the resinates do. Pontianac resin is quite resistant to the action of light and hence its use in paper size in preponderating amount makes possible the production of a paper stock which is not disintegrated seriously under the action of light. Ordinary rosin size, or sodium resinate breaks down in some peculiar way under the action of light and this change may be due to a partial hydrolysis in which both the moisture in the paper and the sun light play a part. Such hydrolysis, or whatever the change may be, produces bodies which affect the fiber of the paper, more or less, and it loses in strength and appearance.

What I claim is,

1. A paper size, comprising an unsaponifiable resin, and a water-soluble resinate.

2. A paper size, comprising a substantially unsaponifiable resin, and an alkali resinate.

3. A paper size, comprising an unsaponifiable resin, and an alkali resinate, said size being miscible with water.

4. A paper size, comprising an unsaponifiable resin, and an alkali resinate.

5. A paper size, comprising a Jellutong resin, and sodium resinate.

6. A paper size, comprising an unsaponifiable rubber resin, alkali resinate and water.

7. A paper size, comprising Jellutong rubber resin, sodium resinate and water.

8. A paper size, comprising a substantially unsaponifiable resin, and a water-soluble soap, said composition being miscible with water.

9. A composition of matter, comprising a substantially unsaponifiable resinous body, a saponified resinous body and water.

10. A composition of matter, comprising a substantially unsaponifiable resinous body and a water-soluble soap, said composition being miscible with water.

11. A composition of matter, comprising an unsaponifiable resin, a water-soluble soap and water.

12. A paper size, comprising a substantially unsaponifiable resin and a colloid carrier.

13. A paper size, comprising Jellutong resin, and a colloid carrier.

14. A paper size, comprising a resinous emulsion containing a substantially unsaponifiable resinous body, substantially unaffected by light.

Signed at Montclair in the county of Essex and State of New Jersey this 20th day of April A. D. 1911.

CARLETON ELLIS.

Witnesses:
SYDNEY M. SPEDON,
BIRDELLA M. ELLIS.